United States Patent
Kim et al.

(10) Patent No.: US 9,743,006 B2
(45) Date of Patent: Aug. 22, 2017

(54) IMAGING APPARATUS

(71) Applicant: SAMSUNG ELECTRONICS CO., LTD., Suwon-si, Gyeonggi-do (KR)

(72) Inventors: Myung-gyu Kim, Yongin-si (KR); Shi-hyun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 78 days.

(21) Appl. No.: 14/501,690

(22) Filed: Sep. 30, 2014

(65) Prior Publication Data

US 2015/0181129 A1    Jun. 25, 2015

(30) Foreign Application Priority Data

Dec. 24, 2013  (KR) .......................... 10-2013-0162658

(51) Int. Cl.
| | |
|---|---|
| H04N 5/262 | (2006.01) |
| H04N 5/238 | (2006.01) |
| G03B 17/00 | (2006.01) |
| H04N 5/232 | (2006.01) |
| G02B 15/14 | (2006.01) |
| G02B 7/10 | (2006.01) |

(52) U.S. Cl.
CPC ......... *H04N 5/23296* (2013.01); *G02B 15/14* (2013.01); *G02B 7/102* (2013.01)

(58) Field of Classification Search
CPC .............. H04N 5/23296; G02B 13/009; G02B 15/00–15/28; G02B 7/04–7/105
USPC ..... 348/240.99, 369, 240.3, 368; 396/72–88, 396/661; 359/676–706
See application file for complete search history.

(56) References Cited

U.S. PATENT DOCUMENTS

| | | | |
|---|---|---|---|
| 2002/0041334 | A1 | 4/2002 | Okawara |
| 2003/0107821 | A1* | 6/2003 | Nakamura ............... G02B 7/08 |
| | | | 359/694 |
| 2004/0022532 | A1* | 2/2004 | Nakamura ............. G02B 7/102 |
| | | | 396/125 |
| 2004/0057723 | A1* | 3/2004 | Uenaka .................... G03B 1/00 |
| | | | 396/661 |
| 2005/0162752 | A1* | 7/2005 | Hayashi ................. G02B 7/102 |
| | | | 359/704 |

(Continued)

FOREIGN PATENT DOCUMENTS

| | | |
|---|---|---|
| KR | 10-2005-0049119 A | 5/2005 |
| WO | WO 2013/046896 A1 | 4/2013 |

OTHER PUBLICATIONS

Extended European Search Report issued for EP 14193213.7 (May 4, 2015).

*Primary Examiner* — Xi Wang
(74) *Attorney, Agent, or Firm* — Drinker Biddle & Reath LLP (57) ABSTRACT

An imaging apparatus includes: a zoom lens unit that forms image light on an imaging unit; a zoom ring that is provided around the zoom lens to be manually rotated; a rotation detection unit including: a slit member that includes a plurality of blades that are spaced apart from one another in a rotation direction and is rotated by being connected to the zoom ring, and a sensor that detects rotation of the slit member and outputs a detection signal; and a lens control unit that adjusts a zoom ratio by driving the zoom lens unit based on the detection signal of the sensor, wherein a rotation ratio of the slit member to the zoom ring is greater than 1.

15 Claims, 9 Drawing Sheets

(56) References Cited

U.S. PATENT DOCUMENTS

| | | | |
|---|---|---|---|
| 2005/0174450 A1 | 8/2005 | Aoyama | |
| 2010/0014851 A1* | 1/2010 | Furuyama | G02B 7/102 396/531 |
| 2010/0060748 A1* | 3/2010 | Tsuchiya | H04N 5/23212 348/222.1 |
| 2011/0164865 A1* | 7/2011 | Hamada | G02B 7/365 396/91 |
| 2012/0075622 A1* | 3/2012 | Nagura | G01D 5/3473 356/138 |
| 2013/0099708 A1* | 4/2013 | Shimizu | H02P 21/146 318/400.39 |
| 2013/0148008 A1 | 6/2013 | Ikeda | |
| 2014/0184903 A1* | 7/2014 | Takahashi | H04N 5/2254 348/374 |
| 2015/0138437 A1* | 5/2015 | Matsuura | G02B 7/102 348/374 |

* cited by examiner

IMAGING APPARATUS

RELATED APPLICATIONS

This application claims the priority benefit of Korean Patent Application No. 10-2013-0162658, filed on Dec. 24, 2013, in the Korean Intellectual Property Office, the disclosure of which is incorporated herein in its entirety by reference.

BACKGROUND

1. Field

One or more embodiments relate to an imaging apparatus that may manually adjust a zoom ratio.

2. Description of the Related Art

An imaging apparatus refers to an apparatus for recording an image of a subject by using an imaging device such as a charge-coupled device (CCD) or a complementary metal-oxide (CMOS) chip that converts light that is incident thereon after passing through a lens unit into an electrical signal. Examples of the imaging apparatus include a digital camera and a digital camcorder.

The lens unit may include a fixed focus lens unit having a fixed focal length and a zoom lens unit having an adjustable focal length. The zoom lens unit is configured such that some of a plurality of lenses that are mounted in the zoom lens unit may be moved along an optical axis. For example, the zoom lens unit includes one or more movable barrels that support the lenses and are movable along the optical axis. Wide-angle shooting and telephoto shooting may be performed as the movable barrels move along the optical axis due to a user's manipulation of a zoom ring.

SUMMARY

One or more embodiments include an imaging apparatus that may precisely detect a user's manipulation of a zoom ring.

Additional aspects will be set forth in part in the description which follows and, in part, will be apparent from the description, or may be learned by practice of the presented embodiments.

According to one or more embodiments, an imaging apparatus includes: a zoom lens unit that forms image light on an imaging unit; a zoom ring that is provided around the zoom lens unit and is to be manually rotated; a rotation detection unit including: a slit member that includes a plurality of blades that are spaced apart from one another in a rotation direction and is connected to the zoom ring, wherein the slit member is rotated by rotation of the zoom ring, and a sensor that detects rotation of the slit member and outputs a detection signal; and a lens control unit that adjusts a zoom ratio by driving the zoom lens unit based on the detection signal of the sensor, wherein a rotation ratio of the slit member to the zoom ring is greater than 1.

The imaging apparatus may further include a rotation member that is disposed between the slit member and the zoom ring, and includes a first connection unit that is connected to the zoom ring and a second connection unit that is connected to the slit member.

The first connection unit may include a friction portion that contacts an inner circumferential surface of the zoom ring by friction contact and rotates, wherein a diameter of the inner circumferential surface is greater than a diameter of the friction portion.

The imaging apparatus may further include a ring gear that is disposed on an inner circumferential surface of the zoom ring, wherein the first connection unit includes a gear that engages with the ring gear, and wherein a number of teeth of the gear is less than a number of teeth of the ring gear.

The imaging apparatus may further include a rotation connection unit which includes a gear connection structure that connects the second connection unit and the slit member.

The sensor may include a first sensor and a second sensor, wherein the first and second sensors are disposed such that respective detection signals of the first and second sensors have a phase difference therebetween.

The sensor may include a photo-interrupter sensor including a light-emitting unit and a light-receiving unit that are disposed to face each other with the plurality of blades therebetween.

The imaging apparatus may further include a main body that supports the zoom lens unit, wherein the zoom ring is disposed on a front surface of the main body.

A rotational axis of the zoom ring may be the same as an optical axis of the zoom lens unit.

According to one or more embodiments, an imaging apparatus includes: a zoom lens unit that forms image light on an imaging unit; a main body that supports the zoom lens unit; a zoom ring that is provided on a front surface of the main body and is to be manually rotated; a rotation detection unit that amplifies a rotation angle of the zoom ring, detects the amplified rotation angle, and outputs a detection signal; and a control unit that controls a zoom ratio by driving the zoom lens unit based on the detection signal of the rotation detection unit.

The rotation detection unit may include: a slit member that is connected to the zoom ring and is rotated by rotation of the zoom ring, wherein a rotation ratio of the slit member to the zoom ring is greater than 1; and a sensor that includes a photo-interrupter sensor that detects rotation of the slit member and outputs the detection signal.

The sensor may include a first sensor and a second sensor that are disposed such that respective detection signals of the first and second sensors have a phase difference therebetween.

The imaging apparatus may further include a rotation member that connects the zoom ring and the slit member and is rotated by rotation of the zoom ring, wherein the rotation member is connected to the zoom ring via a friction-contact structure.

The rotation member may include a rubber ring that contacts an inner circumferential surface of the zoom ring.

The imaging apparatus may further include a rotation connection unit which includes a gear connection structure that connects the rotation member and the slit member.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

As used herein, the term "and/or" includes any and all combinations of one or more of the associated listed items.

Embodiments now will be described more fully hereinafter with reference to the accompanying drawings, in which elements of the embodiments are shown. In the drawings, the same elements are denoted by the same reference numerals, and sizes or thicknesses of elements may be exaggerated for clarity.

Figure 1:
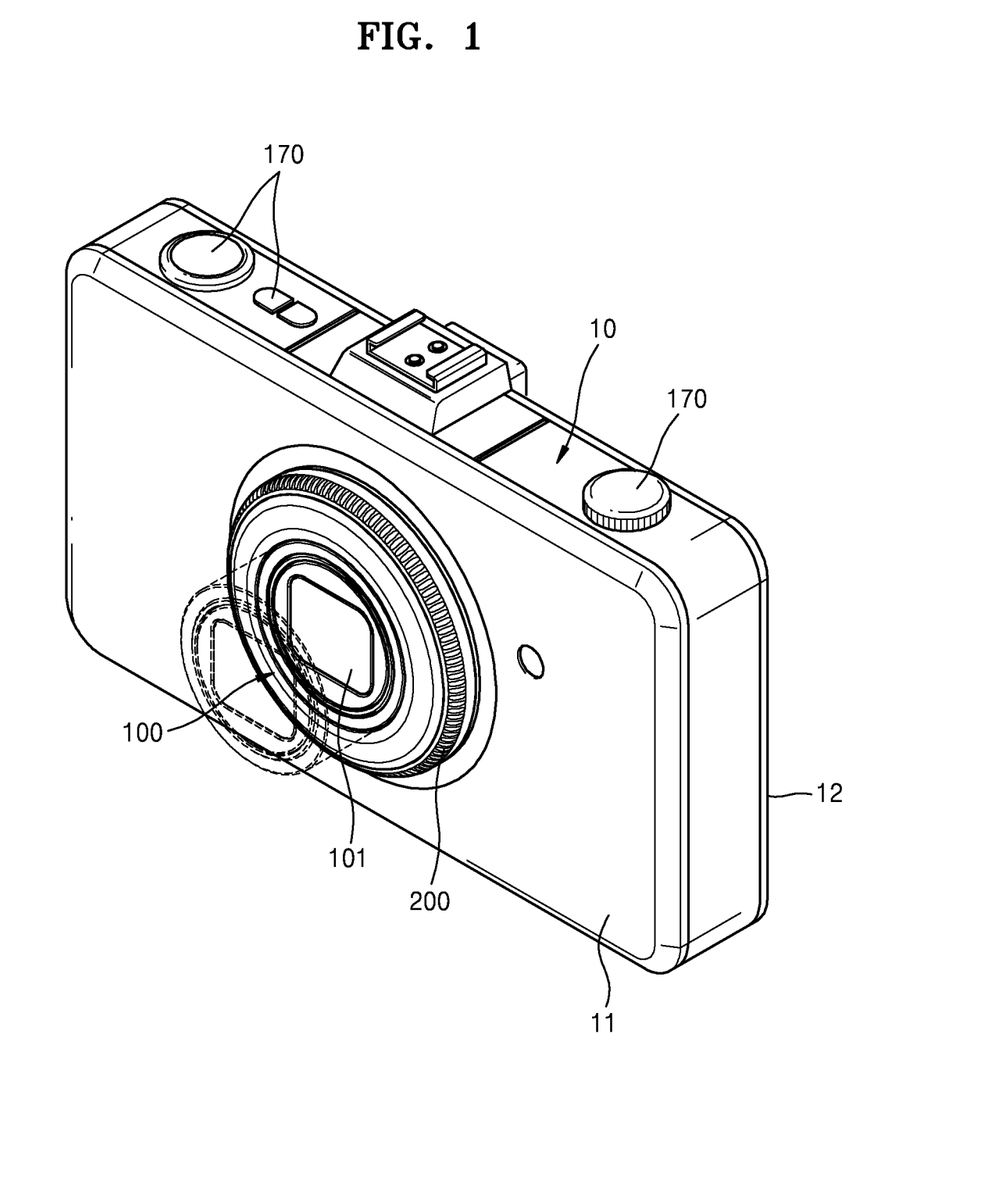
FIG. 1 is a perspective view illustrating the front of an imaging apparatus according to an embodiment.
Figure 2:
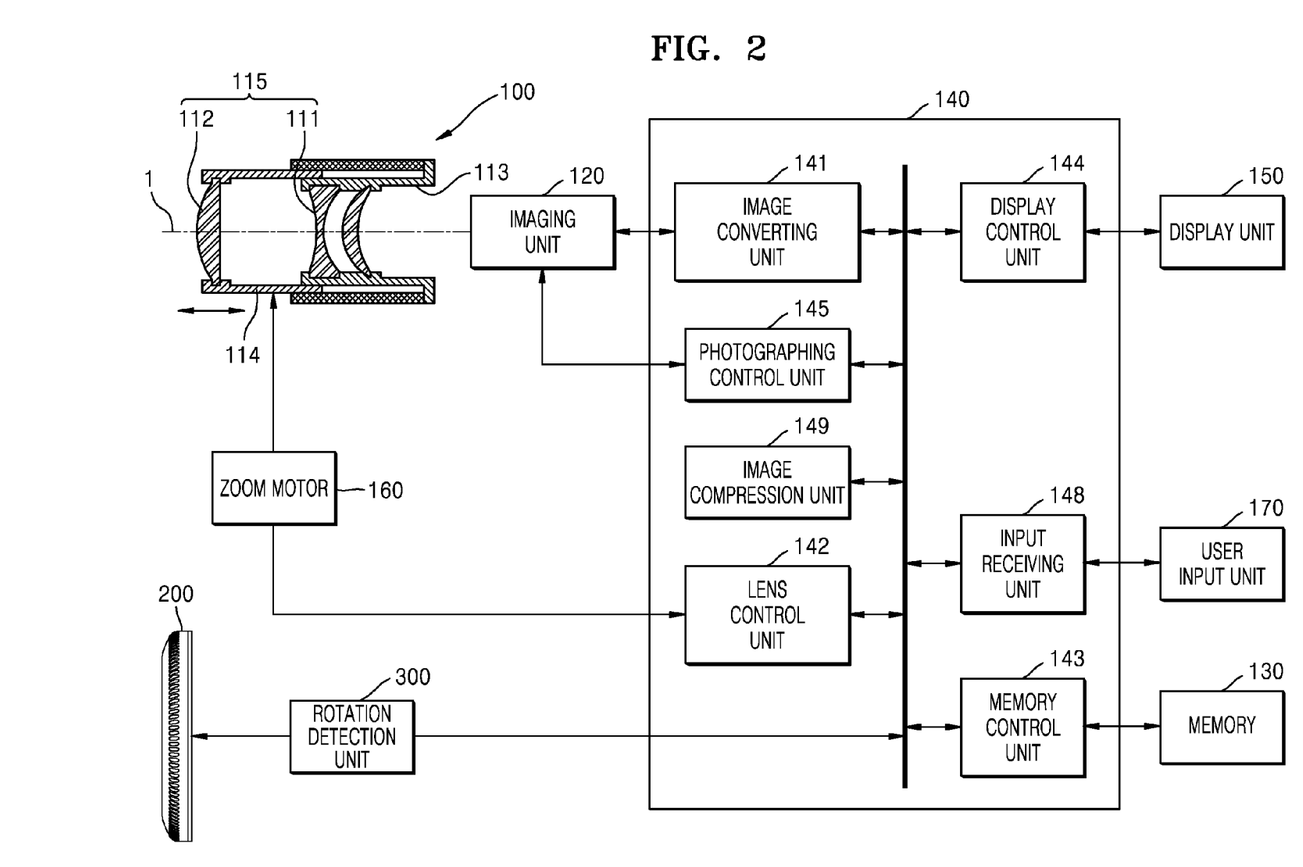
FIG. 2 is a block diagram illustrating elements of the imaging apparatus, according to an embodiment.

FIG. 1 is a perspective view illustrating the front of an imaging apparatus according to an embodiment. FIG. 2 is a block diagram illustrating elements of the imaging apparatus, according to an embodiment. The imaging apparatus of the present embodiment may be any of various devices such as a digital still camera that captures a still image or a video camera that captures a motion picture.

Referring to FIGS. 1 and 2, the imaging apparatus may include a main body 10, a zoom lens unit 100, an imaging unit 120, and a control unit 140. The main body 10 defines an outer appearance of the imaging apparatus. The zoom lens unit 100 is supported by the main body 10 such that an incident window 101 on which light is incident is exposed through a front surface 11 of the main body 10. A second barrel 114 (see FIG. 2) may move forward and backward along an optical axis 1 (see FIG. 2), as marked by a solid line and a dashed line of FIG. 1, in order to adjust a zoom ratio of the zoom lens unit 100.

The zoom lens unit 100 includes a plurality of lenses 115 for forming image light on an imaging surface of the imaging unit 120, and first and second barrels 113 and 114 that support the lenses 115. The lenses 115 may be arranged to change an interval therebetween. When an interval between the lenses 115 is changed, a zoom ratio or a focal point may be adjusted. Positions of the lenses 115 may be changed as the lenses 115 are driven by a driving unit including a zoom motor 160. The lenses 115 may include a zoom lens that increases or reduces a size of a subject and a focus lens that adjusts a focal point of the subject.

The zoom lens unit 100 may have any structure which allows the zoom lens unit 100 to perform wide-angle shooting and telephoto shooting. For example, as shown in FIG. 2, the zoom lens unit 100 may include the first barrel 113 by which a first lens group 111 is supported and the second barrel 114 by which a second lens group 112 is supported. The second barrel 114 may be moved along the optical axis 1 by, for example, the zoom motor 160. Accordingly, wide-angle shooting and telephoto shooting may be performed. A lens control unit 142 of the control unit 140 controls positions of the lenses 115 to adjust a zoom ratio and a focal point. The zoom lens unit 100 may be fixed to the main body 10. When the zoom lens unit 100 is an interchangeable type of lens, the zoom lens unit 100 may be detachably attached to the main body 10. The zoom lens unit 100 is not limited to FIG. 2, and may have any of various structures according to a zoom ratio or the like.

For example, the control unit 140 may include an image converting unit 141, the lens control unit 142, a memory control unit 143, a display control unit 144, an image compression unit 149, a photographing control unit 145, and an input receiving unit 148.

The imaging unit 120 includes an imaging device (not shown) that receives image light and converts the image light into an electrical signal. The imaging device includes a photoelectric conversion device such as a charge-coupled device (CCD) or a complementary metal oxide semiconductor (CMOS) chip, and converts image light that is incident thereon after passing through the lenses 115 into an electrical signal. The imaging unit 120 is driven by a control signal that is applied from the photographing control unit 145. The electrical signal that is generated by the imaging unit 120 is converted by the image converting unit 141 into image data. The photographing control unit 145 of the control unit 140 captures an image by controlling the imaging unit 120.

For example, the image converting unit 141 may convert the electrical signal of the imaging unit 120 into RGB data, and then may convert the RGB data into raw data such as a YUV signal including a luminance (Y) signal and a chrominance (UV) signal. A conversion process performed by the image converting unit 141 may include reducing driving noise of the imaging unit 120 that is included in the electrical signal by using, for example, a correlated-double sampling (CDS) circuit, adjusting a gain of a signal after the noise reduction by using an automatic gain control (AGC) circuit, converting an analog signal into a digital signal by using an analog-to-digital (A/D) converter, and performing signal processing such as defective pixel correction, gain control, white balance, or gamma correction on the digital signal.

The memory control unit 143 controls the recording of data onto a memory 130 and the reading of recorded data or set information from the memory 130. The memory 130 may be a volatile internal memory, and may include a semiconductor memory device such as a synchronous dynamic random-access memory (SDRAM). The memory 130 may function as a buffer memory that temporarily stores the image data that is generated by the image converting unit 141 and as a working memory that is used to process data. Also, the memory 130 may be a nonvolatile external memory, and may be a flash memory such as a memory stick or a secure digital/multimedia card SD/MMC, or a storage apparatus such as a hard disc drive (HDD), or an optical storage apparatus such as a digital versatile disc (DVD) or a compact disc (CD). In this case, the image data that is compressed into a joint photographic experts group (JPEG) file, a tag image file (TIF), a graphics interchange format (GIF) file, or a personal computer exchange (PCX) file by the image compression unit 149 may be stored in the memory 130.

A display unit 150 may be disposed on, for example, a rear surface 12 of the main body 10, and may include a display device such as a liquid crystal display (LCD) device or an organic electroluminescent display device (e.g., an organic light-emitting diode (OLED)). Also, a touch panel that detects a touch and generates a signal corresponding to a position of the touch may be disposed on a surface of the display unit 150.

The user input unit 170 may include any of various buttons or a rotary knob as shown in FIG. 1. A user may capture an image and may check a captured image by using the user input unit 170.

The display unit 150 may display a captured image and an image that is stored in the memory 130. Also, the display unit 150 may provide an image that assists the user in checking the framing of the subject to be photographed and photographing conditions. The image may be formed by the imaging unit 120 and provided to the user through the zoom lens unit 100, before the subject is photographed, along with photographing assistant information such as an iris value, a shutter speed, or a position of a focal point.

The control unit 140 is electrically connected to the imaging unit 120, the zoom lens unit 100, the display unit 150, the user input unit 170, and the memory 130, and transmits/receives a control signal to/from the above elements to control operations of the above elements or processes data. The control unit 140 may include a microchip, or a circuit board including a microchip, and elements that are included in the control unit 140 may include software or circuits embedded in the control unit 140.

The user may select a zoom ratio of the zoom lens unit 100 during an imaging process. According to the imaging apparatus of FIGS. 1 and 2, a zoom ratio may be selected by manipulating a zoom ring 200. The zoom ring 200 is rotatably provided on the front surface 11 of the main body 10. The rotation of the zoom ring 200 is detected by a rotation detection unit 300. The rotation detection unit 300 of FIGS. 1 and 2 amplifies a rotation angle of the zoom ring 200 by an amplification ratio greater than 1 and detects the amplified rotation angle. A rotation detection signal of the rotation detection unit 300 is transmitted to the control unit 140. The control unit 140 calculates a rotation amount and a rotation direction of the zoom ring 200 based on the rotation detection signal, and drives the zoom lens unit 100 based on the calculated rotation amount and the calculated rotation direction. For example, the control unit 140 calculates a zoom ratio from the rotation amount and the rotation direction of the zoom ring 200, and determines a driving amount of the lenses 115 which corresponds to the zoom ratio. Next, the lens control unit 142 controls the zoom motor 160 in order to adjust the zoom ratio of the zoom lens unit 100 such that the zoom ratio corresponds to a manipulation amount of the zoom ring 200.

Figure 3:
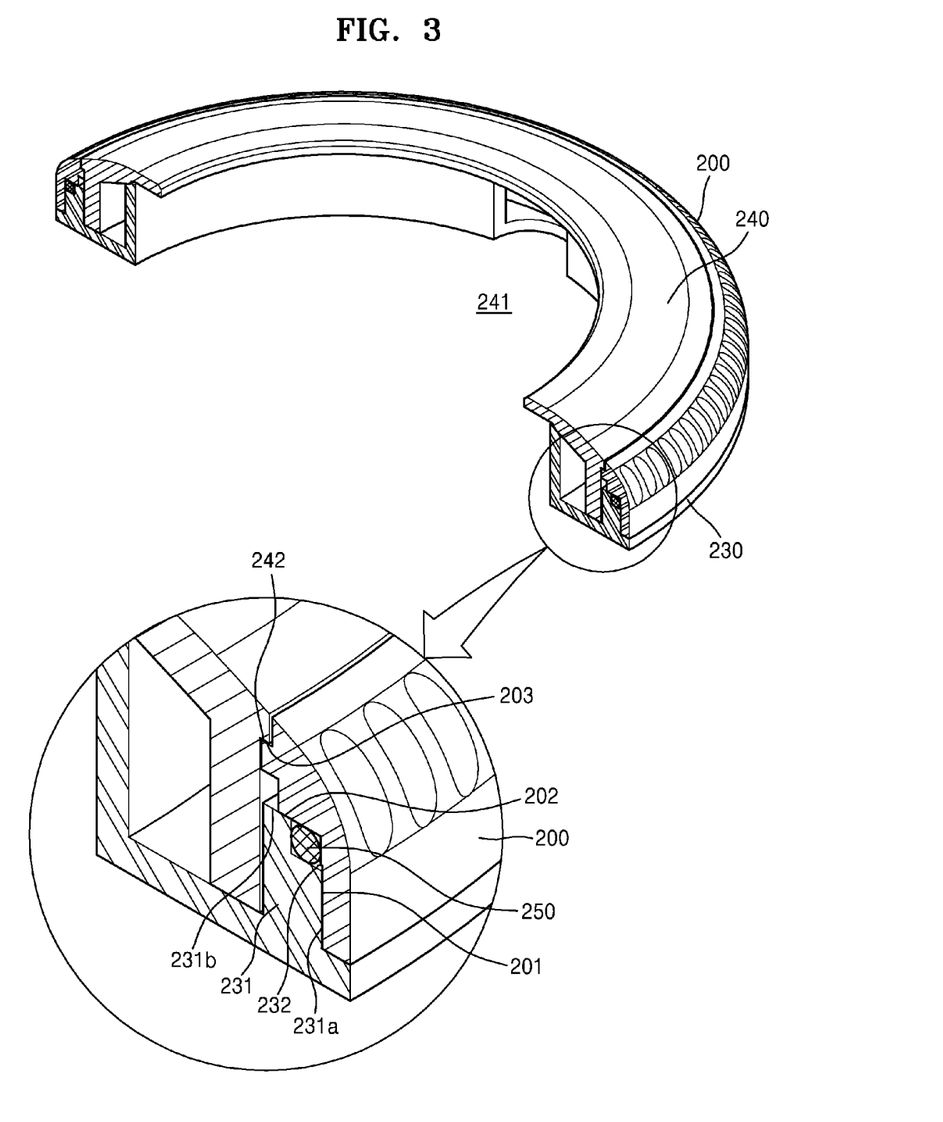
FIG. 3 is a perspective view and a partial cross-sectional view illustrating a zoom ring according to an embodiment.

FIG. 3 is a perspective view and a partial cross-sectional view illustrating the zoom ring 200 according to an embodiment. Referring to FIGS. 1 and 3, the zoom ring 200 is rotatably provided on the front surface 11 of the main body 10. The zoom ring 200 may be shaped to surround the zoom lens unit 100, and a rotational axis of the zoom ring 200 may be the same as the optical axis 1 (see FIG. 2). The user may rotate the zoom ring 200 that is provided on the front surface 11 by using one hand while holding the imaging apparatus in the other hand.

For example, a holder 230 is provided on the front surface 11 of the main body 10. A rib 231 that has an annular shape and protrudes along the optical axis 1 is provided on the holder 230. The zoom ring 200 may be supported by the rib 231 by being installed along the optical axis 1 onto the holder 230. A first support unit 201 and a second support unit 202 that are respectively supported by an outer surface 231a and a top surface 231b of the rib 231 are provided on the zoom ring 200. A lens guide 240 that has a ring shape and includes a hollow portion 241 through which the zoom lens unit 100 passes is disposed inside the zoom ring 200 in a radial direction of the zoom ring 200 and is coupled to the holder 230 by being installed along the optical axis 1 onto the holder 230. The lens guide 240 supports the zoom ring 200 so that the zoom ring 200 does not separate from the holder 230 along the optical axis 1. For example, a third support unit 203 that protrudes inward in the radial direction may be provided on the zoom ring 200, and an outer support unit 242 that protrudes outward in the radial direction from an outer circumferential surface of the lens guide 240 and is disposed outside the third support unit 203 along the optical axis 1 may be provided on the lens guide 240. In this structure, the zoom ring 200 may be disposed between the lens guide 240 and the holder 230 such that the zoom ring 200 does not move along the optical axis 1 and in the radial direction, and may be rotated relative to the holder 230 and the lens guide 240. An O-ring 250 may be disposed between the holder 230 and the zoom ring 200. For example, the O-ring 250 may be provided in a recess portion 232 that is recessed from the outer surface 231a and the top surface 231b of the rib 231. The O-ring 250 may be formed of a material having elasticity such as rubber. When the zoom ring 200 is coupled to the holder 230, the O-ring 250 is elastically pressed by the first and second support units 201 and 202 of the zoom ring 200, which results in rotation resistance with respect to rotation of the zoom ring 200.

Figure 4:
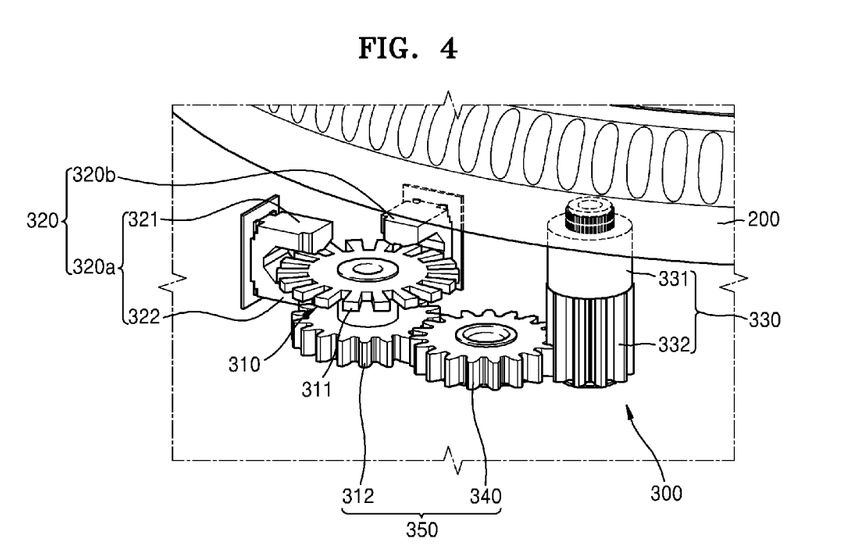
FIG. 4 is a perspective view illustrating a rotation detection unit that detects the rotation of the zoom ring, according to an embodiment.

FIG. 4 is a perspective view illustrating the rotation detection unit 300 that detects the rotation of the zoom ring 200, according to an embodiment. Referring to FIG. 4, the rotation detection unit 300 includes a slit member 310 that is connected to the zoom ring 200 and rotates, and a sensor 320 that detects the rotation of the slit member 310. The slit member 310 includes a plurality of blades 311 that are arranged at predetermined intervals in a rotation direction.

The zoom ring 200 may be connected to the slit member 310 through the rotation member 330, and thereby the slit member 310 rotates when the zoom ring 200 rotates. The rotation member 330 includes a first connection unit 331 that is connected to the zoom ring 200, and a second connection unit 332 that is connected to the slit member 310. A rotation connection unit 350 may be disposed between the second connection unit 332 and the slit member 310.

Figure 5:
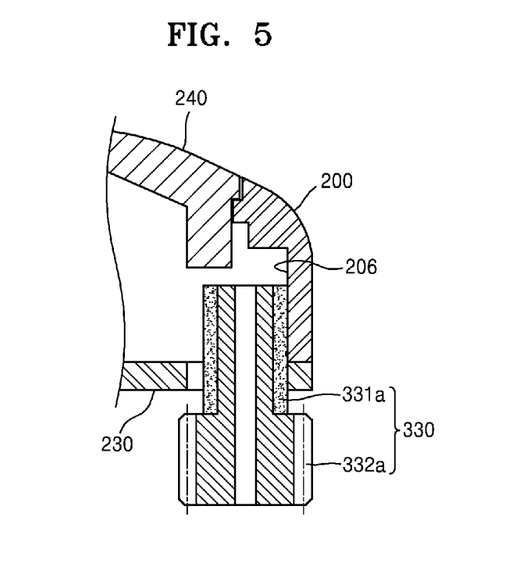
FIG. 5 is a cross-sectional view illustrating a connection structure between a rotation member and the zoom ring, according to an embodiment.

The rotation member 330 and the zoom ring 200 may be connected to each other via any of various connection structures. FIG. 5 is a cross-sectional view illustrating a connection structure between the rotation member 330 and the zoom ring 200, according to an embodiment. Referring to FIG. 5, the rotation member 330 and the zoom ring 200 are connected to each other by using friction contact. The first connection unit 331 contacts an inner circumferential surface 206 of the zoom ring 200 by friction contact. In this case, the first connection unit 331 may include, for example, a friction portion 331a that has a cylindrical shape. The friction portion 331a may be, for example, a rubber ring. In this structure, the zoom ring 200 and the slit member 310 may be connected to each other without providing a power transfer unit on the zoom ring 200. A diameter of the friction portion 331a is less than a diameter of the inner circumferential surface 206 of the zoom ring 200. Accordingly, a rotation ratio of the slit member 310 to the zoom ring 200 may be greater than 1.

Figure 6:
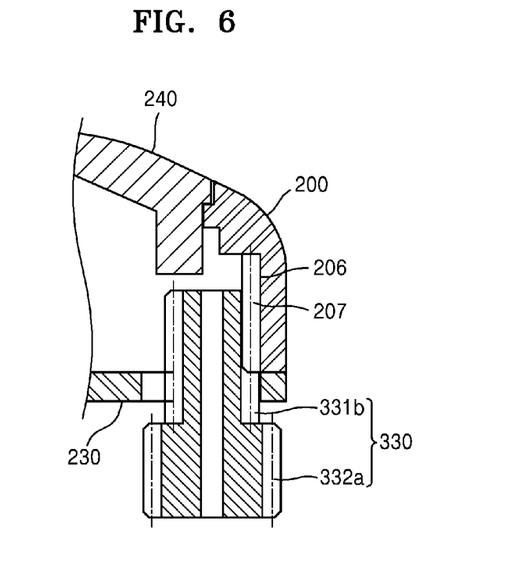
FIG. 6 is a cross-sectional view illustrating a connection structure between the rotation member and the zoom ring, according to another embodiment.

FIG. 6 is a cross-sectional view illustrating a connection structure between the rotation member 330 and the zoom ring 200, according to another embodiment. Referring to FIG. 6, the rotation member 330 may be connected to the zoom ring 200 via a gear connection structure. A ring gear 207 may be provided on the inner circumferential surface 206 of the zoom ring 200, and the first connection unit 331 may include a gear 331b that engages with the ring gear 207. The number of teeth of the gear 331b is less than the number of teeth of the ring gear 207. Accordingly, a rotation ratio of the slit member 310 to the zoom ring 200 may be greater than 1.

A space for connecting the first connection unit 331 and the zoom ring 200 may be obtained by removing a part of the holder 230 and a part of the rib 231.

The rotation connection unit 350 may include any of various rotation transmission structures that may transmit a rotational force of the rotation member 330 to the slit member 310, such as a gear connection structure or a belt connection structure. For example, a gear connection structure may be employed as a connection structure between the rotation member 330 and the slit member 310. In this case, the second connection unit 332 may include a gear 332a as shown in FIG. 5. A gear 312 that has a common axis with the plurality of blades 311 and is spaced apart in an axial direction from the blades 311 may be provided on the slit member 310 as shown in FIG. 4. The gear 332a and the gear 312 may directly engage with each other, or at least one connection gear 340 may be disposed between the gear 332a and the gear 312 as shown in FIG. 4.

Figure 7:
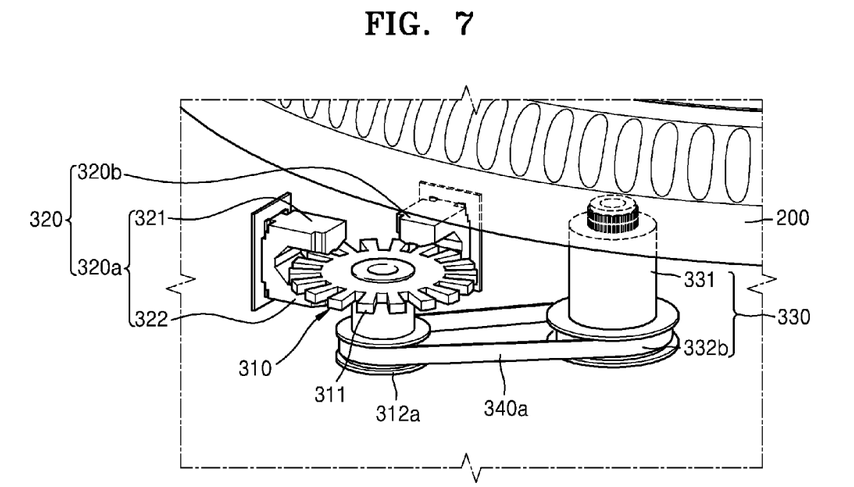
FIG. 7 is a perspective view illustrating a connection structure between the rotation member and a slit member, according to an embodiment.

The rotation member 330 and the slit member 310 may be connected to each other by using a power transfer unit such as a belt or a wire. FIG. 7 is a perspective view illustrating a connection structure between the rotation member 330 and the slit member 310, according to an embodiment. Referring to FIG. 7, the second connection unit 332 may include a driving pulley 332b by which a belt (or a wire) 340a is supported, and a driven pulley 312a that forms a pair with the driving pulley 332b, instead of the gear 312 (see FIG. 4), may be provided on the slit member 310.

In order to detect a rotation amount and a rotation direction of the zoom ring 200, the sensor 320 may include first and second sensors 320a and 320b. The first and second sensors 320a and 320b may be, for example, PI (photo-interrupter) sensors. Each of the first and second sensors 320a and 320b may include a light-emitting unit 321 and a light-receiving unit 322 that are disposed with the blades 311 therebetween. A rotation amount of the zoom ring 200 may be detected by counting the number of the blades 311 passing between the light-emitting unit 321 and the light-receiving unit 322 (that is, by counting the number of times light is detected in the light-receiving unit 322 according to positions of the blades 311).

Figure 8:
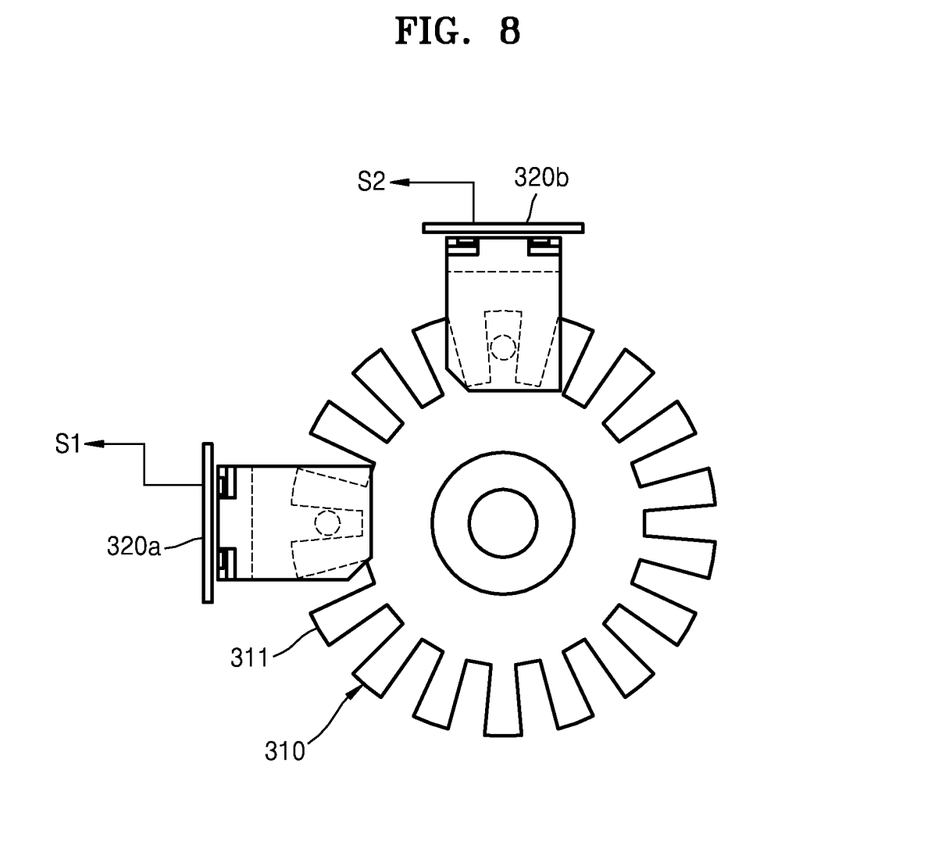
FIG. 8 is a top plan view illustrating an arrangement of first and second sensors, according to an embodiment.

FIG. 8 is a top plan view illustrating an arrangement of the first and second sensors 320a and 320b, according to an embodiment. In order to detect the blades 311, the first and second sensors 320a and 320b are arranged such that detection signals S1 and S2 have a phase difference therebetween. That is, the first and second sensors 320a and 320b are arranged such that the detection signals S1 and S2 do not completely overlap with each other. For example, although the first and second sensors 320a and 320b are arranged such that the detection signals S1 and S2 have a phase difference of 90° in FIG. 8, a phase difference is not limited thereto. A phase difference between the detection signals S1 and S2 may be determined such that a rising edge (or a falling edge) of the detection signal S1 is not the same as a rising edge (or a falling edge) of the detection signal S2.

Figure 9A:
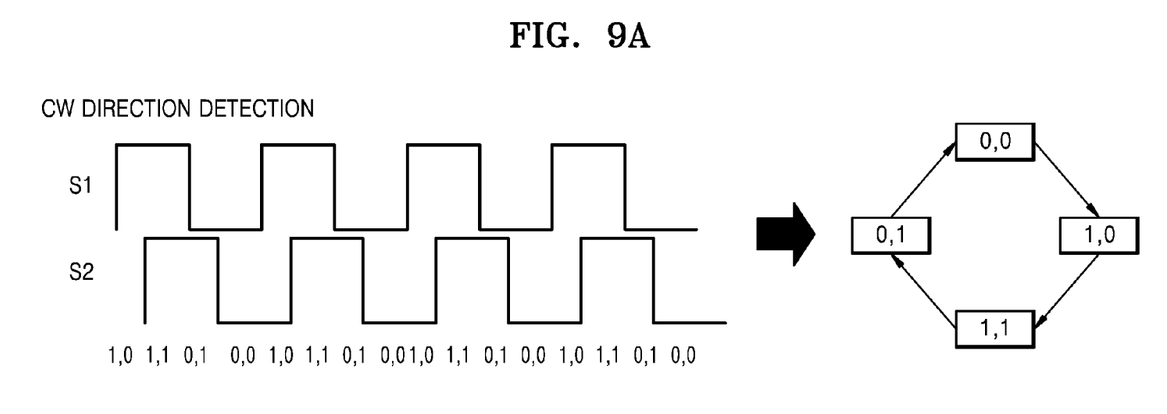
FIG. 9A illustrates detection signals S1 and S2 of the first and second sensors when the zoom ring rotates clockwise, according to an embodiment.
Figure 9B:
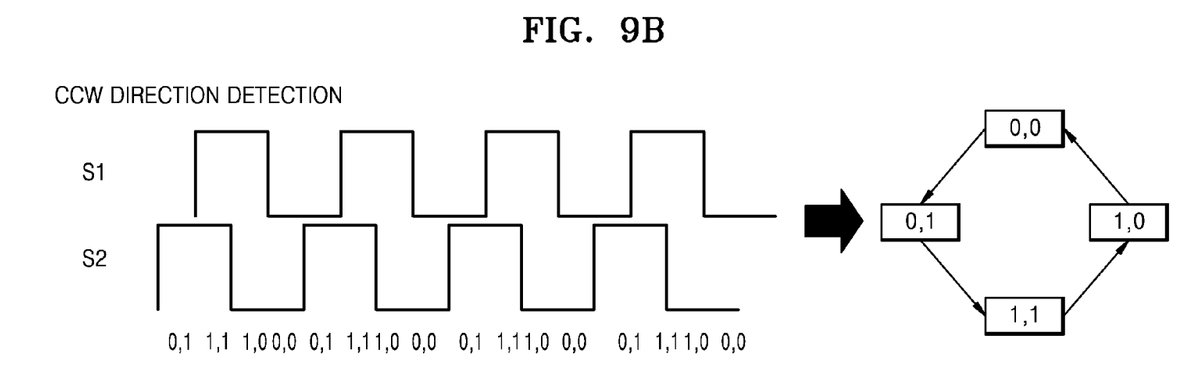
FIG. 9B illustrates the detection signals S1 and S2 of the first and second sensors when the zoom ring rotates counterclockwise, according to an embodiment.

FIG. 9A illustrates the detection signals S1 and S2 of the first and second sensors 320a and 320b when the zoom ring 200 rotates clockwise CW, according to an embodiment. FIG. 9B illustrates the detection signals S1 and S2 of the first and second sensors 320a and 320b when the zoom ring 200 rotates counterclockwise CCW. In FIGS. 9A and 9B, '1' denotes a state where the blades 311 are detected, and '0' denotes a state where the blades 311 are not detected. A combination of the detection signals S1 and S2 at an arbitrary time is one of four states (1, 0), (1, 1), (0, 1), and (0, 0). Referring to FIG. 9A, when the zoom ring 200 rotates clockwise CW, a combination of the detection signals S1 and S2 changes in a circular loop fashion, that is, (1, 0)->(1, 1)->(0, 1)->(0, 0). Referring to FIG. 9B, when the zoom ring 200 rotates counterclockwise CCW, a combination of the detection signals S1 and S2 changes in a circular loop fashion, that is, (0, 0)->(0, 1)->(1, 1)->(1, 0). Hence, a rotation direction of the zoom ring 200 may be detected by determining, based on the detection signals S1 and S2, the circular loop fashion in which a combination of the detection signals S1 and S2 changes.

In other words, when '1' is high (H) and '0' is low (L), a combination of the detection signals S1 and S2 may be as follows.

TABLE 1

| State | S1 | S2 |
| --- | --- | --- |
| A1 | L | L |
| A2 | H | L |
| A3 | H | H |
| A4 | L | H |

In Table 1, when the zoom ring 200 rotates clockwise CW, a combination of the detection signals S1 and S2 is changed as A1-A2-A3-A4-A1-A2 . . . , and when the zoom ring 200 rotates counterclockwise CCW, a combination of the detection signals S1 and S2 is changed as A4-A3-A2-A1-A4-3 . . . . Hence, when a combination of the detection signals S1 and S2 changes from state 'A4' to state 'A3', it is determined that the zoom ring 200 rotates counterclockwise CCW, and when a combination of the detection signals S1 and S2 is changed from state 'A4' to state 'A1', it is determined that the zoom ring 200 rotates clockwise CW.

A rotation amount of the zoom ring 200 may be calculated by counting the number of states 'H' or states 'L' of any one of the detection signals S1 and S2 of the first and second sensors 320a and 320b and multiplying the number by a rotation angle of the slit member 310 corresponding to a period of any one of the detection signals S1 and S2 and a rotation ratio of the slit member 310 to the zoom ring 200.

A diameter of the friction portion 331a or the number of teeth of the gear 331b is much less than a diameter of the inner circumferential surface 206 of the zoom ring 200 or the number of teeth of the gear 207 that is provided on the inner circumferential surface 206. Hence, a rotation ratio of the slit member 310 to the zoom ring 200 may be greater than 1. Accordingly, a rotation amount (or a rotation angle) of the zoom ring 200 is amplified and transmitted to the slit member 310. As such, since a rotation ratio of the slit member 310 to the zoom ring 200 may be greater than 1, a rotation amount of the zoom ring 200 may be detected by the sensor 320 with a very high sensitivity, and a zoom ratio may be precisely adjusted by slightly rotating the zoom ring 200.

Figure 10:
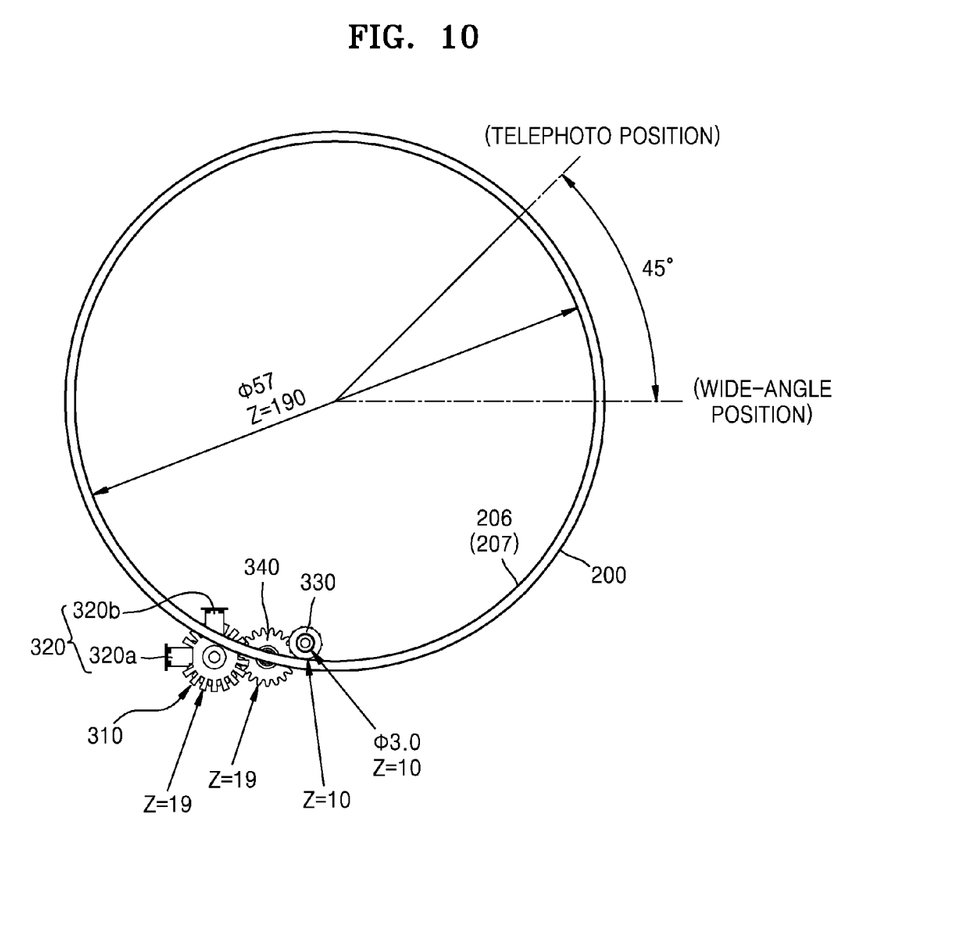
FIG. 10 is a view illustrating a rotation ratio of the slit member to the zoom ring, according to an embodiment.

For example, FIG. 10 is a view illustrating a rotation ratio of the slit member 310 to the zoom ring 200, according to an embodiment. Referring to FIG. 10, a diameter of the inner circumferential surface 206 of the zoom ring 200 is 57 mm, and a diameter of the first connection unit 331 that friction-contacts the inner circumferential surface 206 is 3 mm. Also, the number of teeth of the gear 332a of the second connection unit 332 is 10, and the number of teeth of the gear 312 of the slit member 310 is 19. Since the connection gear 340 is a single stage gear, the number of teeth of the connection gear 340 does not affect a rotation ratio.

In this structure, $$\text{Rotation ratio} = \frac{57}{3} \times \frac{10}{19} = 10$$

When the zoom ring 200 and the rotation member 330 are connected to each other via a gear connection structure, the number of teeth of the gear 207 that is provided on the inner circumferential surface 206 of the zoom ring 200 is 190, and the number of teeth of the gear 332a of the first connection unit 331 is 10, then the rotation ratio is 10.

Referring to FIG. 10, when the zoom ring 200 rotates by 1°, the slit member 310 rotates by 10°. Hence, a rotation amount of the zoom ring 200 may be detected with a very high sensitivity. For example, when the zoom ring 200 rotates by 45°, the slit member 310 may rotate by 450°, and a zoom ratio may be adjusted from a wide-angle position to a telephoto position by rotating the zoom ring by 45°. A zoom ratio between a wide-angle position and a telephoto position may be divided into 45 increments and may be adjusted by setting an interval between adjacent blades 311 to, for example, 10°. Also, the rotation of the zoom ring 200 may be stably detected with no rotation detection error by selecting an interval between the blades 311 suitable for high speed rotation of the zoom ring 200.

A rotation ratio may be determined based on a diameter of the friction portion 331a, numbers of teeth of the gear 332a and the gear 312, and diameters of the driving pulley 332b and the driven pulley 312a, and a desired sensitivity with which a rotation amount is detected may be obtained by adjusting the above parameters.

Figure 11:
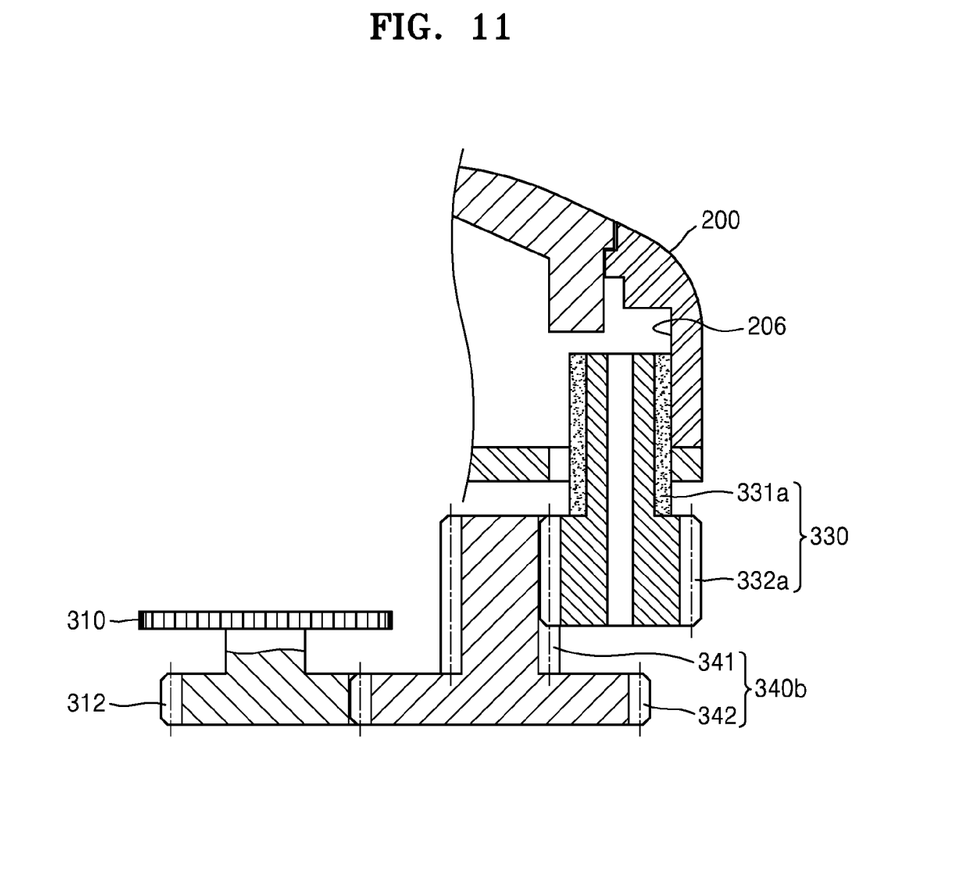
FIG. 11 is a cross-sectional view for explaining a method of adjusting the rotation ratio of the slit member to the zoom ring, according to an embodiment.

FIG. 11 is a cross-sectional view for explaining a method of adjusting the rotation ratio of the slit member to the zoom ring, according to an embodiment. A rotation ratio may be adjusted by employing a double stage gear as an embodiment of the connection gear 340 as shown in FIG. 11. For example, a connection gear 340b includes a gear 341 that engages with the gear 332a, and a gear 342 that engages with the gear 312. The number of teeth of the gear 341 is less than the number of teeth of the gear 342. In this structure, a rotation ratio may be further increased. In contrast, a rotation ratio may be reduced by causing the number of teeth of the gear 341 to be greater than the number of teeth of the gear 342.

Although a conventional method of forming a pattern in which black and white are repeatedly arranged on the inner circumferential surface 206 of the zoom ring 200 and detecting the pattern by using a reflective optical sensor has been used, the conventional method has a limitation in reducing an interval between black and white and thus has a limitation in increasing a sensitivity with which a rotation amount of the zoom ring 200 is detected. Also, since the rotation amount of the zoom ring 200 is directly detected without being amplified, when the zoom ring 200 rotates at a high speed, a detection error may occur.

According to the imaging apparatus of the present embodiment, since a rotation ratio of the slit member 310 to the zoom ring 200 is greater than 1, a rotation amount of the zoom ring 200 may be detected with a high sensitivity. Also, a zoom ratio between a wide-angle position and a telephoto position may be selected by reducing a rotation amount of the zoom ring 200, and even when the zoom ring 200 rotates at a high speed, the rotation of the zoom ring 200 may be stably detected.

When a PI sensor is employed as the sensor, a rotation amount of the zoom ring 200 may be detected with a higher precision than when a reflective optical sensor is employed.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. Descriptions of features or aspects within each embodiment should typically be considered as available for other similar features or aspects in other embodiments unless stated otherwise. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a computer-readable media such as non-transitory magnetic storage media (e.g., magnetic tapes, hard disks, floppy disks), non-transitory optical recording media (e.g., CD-ROMs, Digital Versatile Discs (DVDs), etc.), and non-transitory solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. An imaging apparatus comprising:
a main body comprising a front surface;
a zoom lens unit that forms image light on an imaging unit, the zoom lens unit being supported by the main body such that an incident window of the zoom lens unit on which light is incident is exposed through the front surface of the main body;
a zoom ring of the main body that is provided on the front surface of the main body around the zoom lens unit, is separate from the zoom lens unit, and is to be manually rotated;
a holder provided on the front surface and comprising a rib that rotatably supports the zoom ring;
a lens guide that has a ring shape and includes a hollow portion through which the zoom lens unit passes;
a rotation detection unit comprising:
a slit member that comprises a plurality of blades that are spaced apart from one another in a rotation direction and is connected to the zoom ring, wherein the slit member is rotated by rotation of the zoom ring, and
a sensor that detects rotation of the slit member and outputs a detection signal;
a lens control processor that adjusts a zoom ratio by driving the zoom lens unit based on the detection signal of the sensor; and
a rotation member that is disposed between the slit member and the zoom ring, and comprises a first connection unit that is connected to the zoom ring and a second connection unit that is connected to the slit member,
wherein the first connection unit contacts an inner circumferential surface of the zoom ring,
wherein a rotation ratio of the slit member to the zoom ring is greater than 1,
wherein the lens guide is disposed inside the zoom ring in a radial direction of the zoom ring, and is coupled to the holder to support the zoom ring so that the zoom ring does not separate from the holder along an optical axis.

2. The imaging apparatus of claim 1, wherein the first connection unit comprises a friction portion that contacts the inner circumferential surface of the zoom ring by friction contact and rotates,
wherein a diameter of the inner circumferential surface is greater than a diameter of the friction portion.

3. The imaging apparatus of claim 1, further comprising a ring gear that is disposed on the inner circumferential surface of the zoom ring,
wherein the first connection unit comprises a gear that engages with the ring gear, and
wherein a number of teeth of the gear is less than a number of teeth of the ring gear.

4. The imaging apparatus of claim 1, further comprising a rotation connection unit which comprises a gear connection structure that connects the second connection unit and the slit member.

5. The imaging apparatus of claim 1, wherein the sensor comprises a first sensor and a second sensor,
wherein the first and second sensors are disposed such that respective detection signals of the first and second sensors have a phase difference therebetween.

6. The imaging apparatus of claim 1, wherein the sensor comprises a photo-interrupter sensor comprising a light-emitting unit and a light-receiving unit that are disposed to face each other with the plurality of blades therebetween.

7. The imaging apparatus of claim 1, wherein a rotational axis of the zoom ring is the same as an optical axis of the zoom lens unit.

8. An imaging apparatus comprising:
a zoom lens unit that forms image light on an imaging unit;
a main body that supports the zoom lens unit such that an incident window of the zoom lens unit on which light is incident is exposed through a front surface of the main body;
a zoom ring of the main body that is provided on the front surface of the main body, is separate from the zoom lens unit, and is to be manually rotated;
a holder provided on the front surface and comprising a rib that rotatable supports the zoom ring;
a lens guide that has a ring shape and includes a hollow portion through which the zoom lens unit passes;
a rotation detection unit that amplifies a rotation angle of the zoom ring, detects the amplified rotation angle, outputs a detection signal, and comprises a slit member; and
a control processor that controls a zoom ratio by driving the zoom lens unit based on the detection signal of the rotation detection unit;
a rotation member that connects the zoom ring and the slit member of the rotation detection unit, and comprises a first connection unit that is connected to the zoom ring and a second connection unit that is connected to the slit member,
wherein the first connection unit contacts an inner circumferential surface of the zoom ring,
wherein the lens guide is disposed inside the zoom ring in a radial direction of the zoom ring, and is coupled to the holder to support the zoom ring so that the zoom ring does not separate from the holder along an optical axis.

9. The imaging apparatus of claim 8, wherein the rotation detection unit comprises:
a sensor that comprises a photo-interrupter sensor that detects rotation of the slit member and outputs the detection signal;
wherein the slit member is connected to the zoom ring and is rotated by rotation of the zoom ring, wherein a rotation ratio of the slit member to the zoom ring is greater than 1.

10. The imaging apparatus of claim 9, wherein the sensor comprises a first sensor and a second sensor that are disposed such that respective detection signals of the first and second sensors have a phase difference therebetween.

11. The imaging apparatus of claim 10, wherein the rotation member is rotated by rotation of the zoom ring, wherein the rotation member is connected to the zoom ring via a friction-contact structure.

12. The imaging apparatus of claim 11, wherein the rotation member comprises a rubber ring that contacts an inner circumferential surface of the zoom ring.

13. The imaging apparatus of claim 11, further comprising a rotation connection unit which comprises a gear connection structure that connects the rotation member and the slit member.

14. The imaging apparatus of claim 1, further comprising:
a member providing rotation resistance with respect to rotation of the zoom ring.

15. The imaging apparatus of claim 14, wherein the member comprises an O-ring that is disposed between the holder and the zoom ring and is elastically pressed between the holder and the zoom ring.

* * * * *